United States Patent
Chan

(10) Patent No.: US 10,671,269 B2
(45) Date of Patent: Jun. 2, 2020

(54) ELECTRONIC DEVICE WITH LARGE-SIZE DISPLAY SCREEN, SYSTEM AND METHOD FOR CONTROLLING DISPLAY SCREEN

(71) Applicant: Chiun Mai Communication Systems, Inc., New Taipei (TW)

(72) Inventor: Chih-Min Chan, New Taipei (TW)

(73) Assignee: Chiun Mai Communication Systems, Inc., Taipei (TW)

( * ) Notice: Subject to any disclaimer, the term of this patent is extended or adjusted under 35 U.S.C. 154(b) by 216 days.

(21) Appl. No.: 15/672,303

(22) Filed: Aug. 9, 2017

(65) Prior Publication Data
US 2018/0046349 A1   Feb. 15, 2018

(30) Foreign Application Priority Data
Aug. 10, 2016 (CN) .......................... 2016 1 0650682

(51) Int. Cl.
G06F 3/041 (2006.01)
G06F 3/0488 (2013.01)
G06F 3/0481 (2013.01)
G06F 3/0484 (2013.01)

(52) U.S. Cl.
CPC .......... *G06F 3/0488* (2013.01); *G06F 3/0416* (2013.01); *G06F 3/04812* (2013.01); *G06F 3/04817* (2013.01); *G06F 3/04842* (2013.01); G06F 2203/04104 (2013.01); G06F 2203/04808 (2013.01)

(58) Field of Classification Search
CPC .. G06F 3/0488; G06F 3/0416; G06F 3/04817; G06F 3/04842
USPC ........................................................ 345/173
See application file for complete search history.

(56) References Cited

U.S. PATENT DOCUMENTS

| | | | | |
|---|---|---|---|---|
| 2003/0234768 A1* | 12/2003 | Rekimoto | ............. | G06F 1/1626 345/169 |
| 2006/0247855 A1* | 11/2006 | de Silva | ................. | G01C 21/36 701/454 |
| 2012/0236022 A1* | 9/2012 | Homma | ................ | G06F 3/0488 345/619 |
| 2014/0062894 A1* | 3/2014 | Werner | ................. | G06F 3/0488 345/173 |
| 2015/0130718 A1* | 5/2015 | Sahashi | ................. | G06F 3/0482 345/158 |
| 2015/0355735 A1* | 12/2015 | Matsuda | ............... | G06F 3/0488 345/162 |
| 2016/0132139 A1* | 5/2016 | Du | ........................ | G06F 3/0488 345/173 |
| 2016/0364137 A1* | 12/2016 | Ren | ......................... | G06F 3/038 |

* cited by examiner

Primary Examiner — Jonathan M Blancha
(74) Attorney, Agent, or Firm — ScienBiziP, P.C.

(57) ABSTRACT

An electronic device includes a processor and a touch display screen. The touch display screen displays a touch icon. The processor receives a first touch operation and a second touch operation through a touch area of the electronic device. The processor moves the touch icon according to the first touch operation. The processor performs a touch operation at an indication position of the touch icon according to the second touch operation, and the touch operation is the same as or corresponding to the second touch operation. The indication position of the touch icon is located outside the touch area.

18 Claims, 15 Drawing Sheets

ELECTRONIC DEVICE WITH LARGE-SIZE
DISPLAY SCREEN, SYSTEM AND METHOD
FOR CONTROLLING DISPLAY SCREEN

CROSS-REFERENCE TO RELATED
APPLICATIONS

This application claims priority to Chinese Patent Application No. 201610650682.X filed on Aug. 10, 2016, the contents of which are incorporated by reference herein.

FIELD

The subject matter herein generally relates to an electronic device, system and method for controlling a display screen.

BACKGROUND

With a rapid development of wireless communication technology, portable electronic devices, for example, mobile phones or tablet personal computers (PCs) have a display screen with a large size to browse webs, play games, movies, and so on. However, when a user controls the large-size display screen, there is usually an area where a finger is not accessible, especially the area where a thumb is not accessible. Additionally, some of control elements of applications on the display screen may be too small to operate easily, which will cause an inconvenient operation.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout several views.

DETAILED DESCRIPTION

Figure 1:
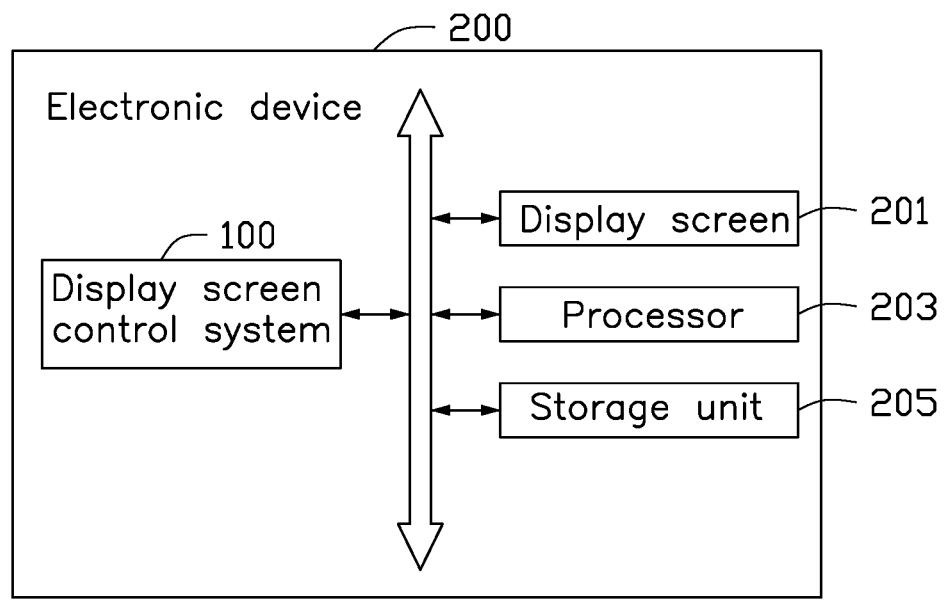
FIG. 1 is an application environment diagram of a display screen control system according to a first exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 illustrates a display screen control system 100 according to a first exemplary embodiment. The display screen control system 100 runs in an electronic device 200. The electronic device 200 can be a mobile phone, a tablet computer, or a personal digital assistant (PDA). The electronic device 200 includes a display screen 201, a processor 203, and a storage unit 205. The display screen 201 may be a touch screen having a touch function for displaying a user interface or browsing information for a user, such as browsing a web page or reading a document.

Figure 2:
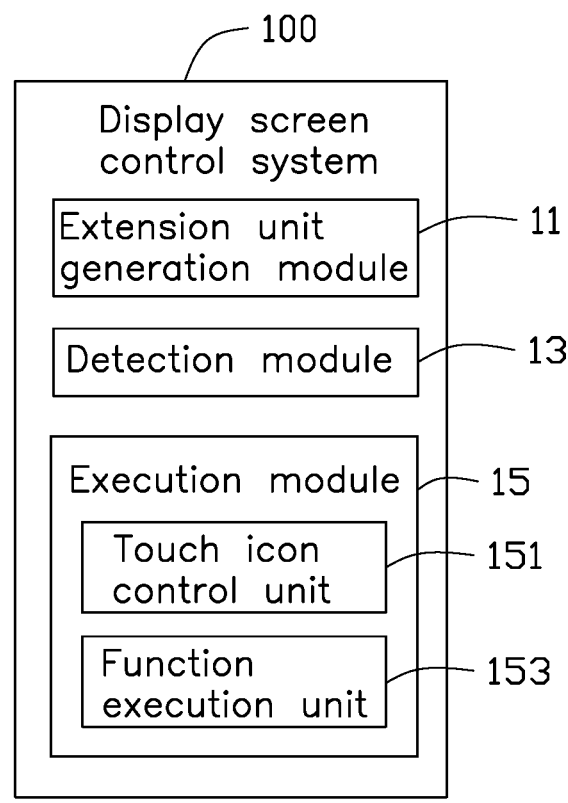
FIG. 2 is a block diagram of the display screen control system of FIG. 1.

The display screen control system 100 may include one or more software modules, which are software blocks having particular functions. The software blocks are stored in a readable storage medium or other storage device of the electronic device 200. For example, these software blocks are stored in the storage unit 205 and are executed by the processor 203. As illustrated in FIG. 2, in this exemplary embodiment, the display screen control system 100 includes an extension unit generation module 11, a detection module 13, and an execution module 15.

Figure 3:
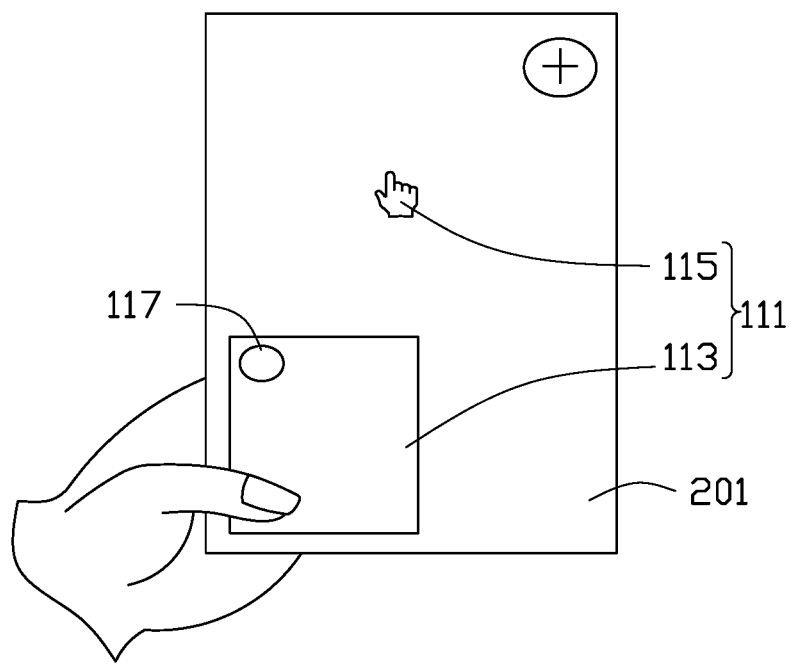
FIG. 3 is a schematic view of a touch extension unit of the display screen control system of FIG. 1.

As illustrated in FIG. 3, the extension unit generation module 11 generates a touch extension unit 111. The touch extension unit 111 is displayed on the display screen 201. The touch extension unit 111 includes a touch area 113 and a touch icon 115.

In this exemplary embodiment, the touch area 113 is substantially rectangular. The touch icon 115 is substantially palm-shaped. In other exemplary embodiments, the touch area 113 is not limited to be rectangular and may also be other shapes, such as circular or the like. The shape of the touch icon 115 may also be adjusted according to user's needs, for example, the touch icon 115 may be arrow-shaped.

The detection module 13 detects a touch operation of an objection (such as a user's finger) on the touch area 113.

The execution module 15 includes a touch icon control unit 151 and a function execution unit 153. In this exemplary embodiment, the touch area 113 is separated with the touch icon 115. That is, the touch icon 115 is an icon independently positioned outside the touch area 113 and an indication position of the touch icon 115 is also located outside the touch area 113. In this exemplary embodiment, the indication position of the touch icon 115 is at a fingertip of a forefinger of a palm. In other exemplary embodiments, when the touch icon 115 is substantially arrow-shaped, the indication position of the touch icon 115 is at a tip of the arrow.

In this exemplary embodiment, the touch icon 115 can be moved through performing a first touch operation on the touch area 113. The detection module 13 detects the first touch operation. Specifically, the touch icon control unit 151 controls the touch icon 115 to perform a corresponding action based on the first touch operation of the object (for example, the user's finger) on the touch area 113. For example, when the detection module 13 detects that the user's finger is moving, rotating, or the like on the touch area 113, the touch icon control unit 151 controls the touch icon 115 to perform a corresponding movement, rotation, or the like.

The first touch operation may include a movement direction, a displacement size, and/or a movement speed of an object, such as a user's finger on the touch area 113. In this exemplary embodiment, the touch icon control unit 151 further controls the touch icon 115 to move along the movement direction of the object (such as the user's finger) on the touch area 113 detected by the detection module 13. When the touch icon control unit 151 controls the touch icon 115 to move, the touch icon control unit 151 also determines a displacement size and a movement speed of the touch icon 115 according to the displacement size and the movement speed of the object on the touch area 113 detected by the detection module 13. The touch icon control unit 151 further controls a movement of the touch icon 115 according to the determined displacement size and the determined movement speed. That is, the movement of the object (such as the user's finger) on the touch area 113 is in a mapping relationship with the movement of the touch icon 115. For example, the displacement size and the movement speed of the first touch operation on the touch area 113 can be respectively multiplied by a preset value by the touch icon control unit 151 to serve as a displacement size and a movement speed of the touch icon 115.

In this exemplary embodiment, the touch icon control unit 151 further controls the touch icon 115 to move accordingly with a position generating the touch icon 115 as a starting position.

In this exemplary embodiment, the touch area 113 further includes an execution icon 117. When the touch icon 115 is controlled to move to a corresponding touch position through performing a first touch operation on the touch area 113, a second touch operation on the touch area 113 can be performed. Then according to an indication position of the second touch operation on the touch icon 115, the function execution unit 153 performs a touch operation that is the same as or corresponding to the second touch operation.

Figure 4:
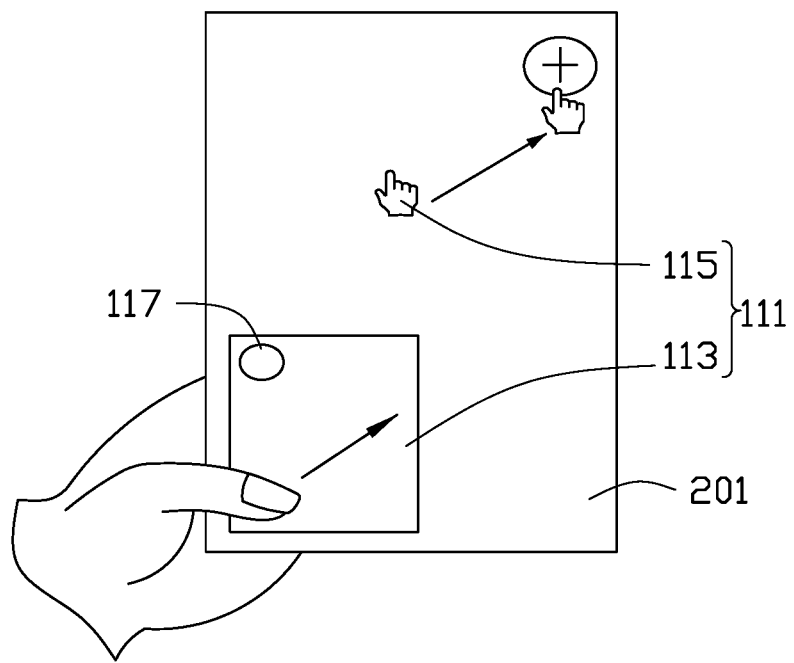
FIG. 4 is a schematic view showing a touch icon of the touch extension unit of FIG. 3 is controlled to move.

In this exemplary embodiment, the second touch operation is performed by clicking on the execution icon 117. The first touch operation is performed on the other portion of the touch area 113 except the execution icon 117. For example, referring to FIG. 4, when the first touch operation is performed on the touch area 113, the touch icon 115 is moved to any one of control elements on the display screen 201, for example, a zooming key. Then at the zooming key, the second touch operation may be performed by clicking the execution icon 117 so that the function execution unit 153 performs an operation that is the same as or corresponding to the second touch operation. For example, the zooming key is clicked to perform an enlarging function, for example, to enlarge texts and/or images.

In this exemplary embodiment, the control elements may be a control key of a user interface displayed on the display screen 201, icons for initiating various application programs (Apps), and/or other icons or areas that may accept various touch operations.

In other exemplary embodiments, the second touch operation is not limited to click the execution icon 117 and may also be other touch methods. For example, the execution icon 117 may be omitted and the second touch operation may be performed by clicking, long pressing, sliding, double-clicking, or force-touching the touch area 113, or simply leaving the touch area 113. Then, at the indication position of the touch icon 115, the function execution unit 153 is triggered to perform an operation which is the same as or corresponding to the second touch operation. For example, in other exemplary embodiments, when the App on the display screen 201 needs to be activated, only the touch area 113 is operated by the finger of the user, then the indication position of the touch icon 115 is controlled to move to an activated App icon position, and releases the finger (that is, the finger leaves the touch area 113). The detection module 13 detects a departure of the user's finger, then causes the function execution unit 153 to perform a corresponding operation, that is, starting the App. The above-described operation method is as follow: to perform a first touch operation on the touch area 113→to control the indication position of the touch icon 115 to move to the activated App icon position→to perform a second touch operation (release finger)→the function execution unit 153 activates the App, which needs not to operate the execution icon 117, that is, the execution icon 117 may be omitted.

In this exemplary embodiment, when the touch icon 115 moves on the display screen 201, the touch icon control unit 151 further dynamically calculates a distance between the indication position of the touch icon 115 and a control element in a vicinity of the touch icon 115. When the distance is less than a predetermined distance, the touch icon control unit 151 automatically moves the touch icon 115 so that the indication position of the touch icon 115 is moved to the control element and the control element is lit to remind the user.

In other exemplary embodiments, when there is a plurality of control elements in a vicinity of the touch icon 115, the touch icon control unit 151 dynamically calculates a distance between the indication position of the touch icon 115 and each of the control elements. When a plurality of the distances between the control elements and the indication position of the touch icon 115 are all less than the predetermined distance, the touch icon control unit 151 searches for the control element which is closest to the indication position of the touch icon 115. That is, the touch icon 115 is controlled to be paired with the closest control element and the touch icon 115 is automatically moved so that the indication position of the touch icon 115 is moved to the closest control element and the closest control element is lit to remind the user.

Figure 5:
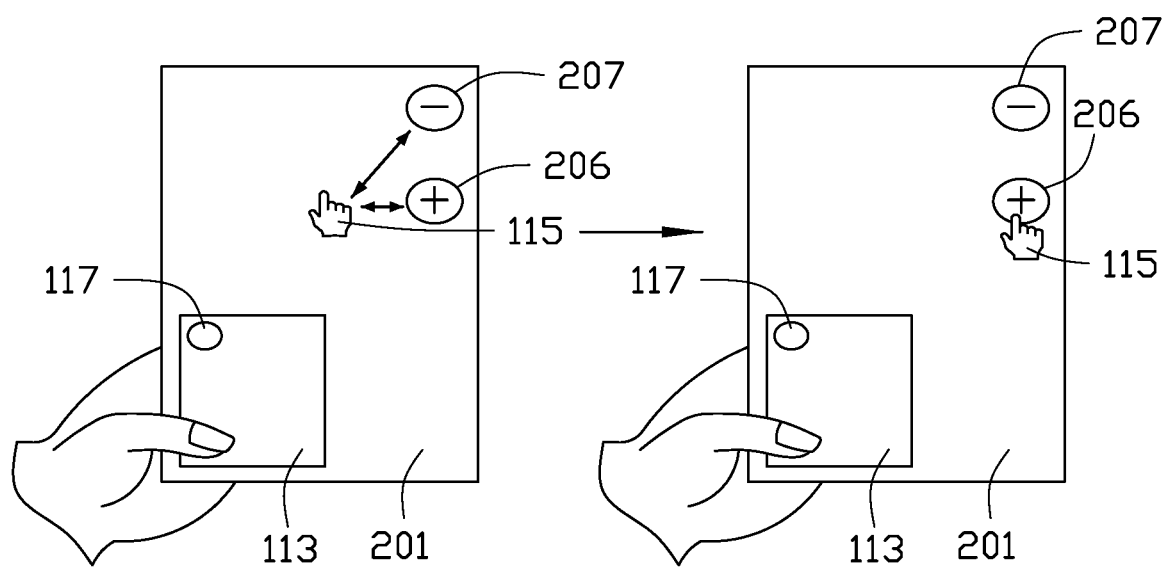
FIG. 5 is a schematic view showing the touch icon of the touch extension unit of FIG. 3 is controlled to be paired with a closest function control key.

For example, as illustrated in FIG. 5, when the touch icon 115 moves on the display screen 201, the touch icon control unit 151 dynamically calculates a first distance between the indication position of the touch icon 115 and the first control element 206 (e.g., a zoom key) in the vicinity of the touch icon 115 and a second distance between the indication position of the touch icon 115 and the second control element 207 (e.g., a reducing key) in the vicinity of the touch icon 115. When the first distance is less than the second distance, the touch icon control unit 151 controls the touch icon 115 to be paired with the first control element 206 (e.g., a zoom key), that is, the first control element 206 is selected by default and the touch icon 115 is automatically moved. The movement continues until the indication position of touch icon 115 is moved to the closest first control element 206 and the first control element 206 (e.g., a zoom key) is lit to remind the user.

Figure 6:
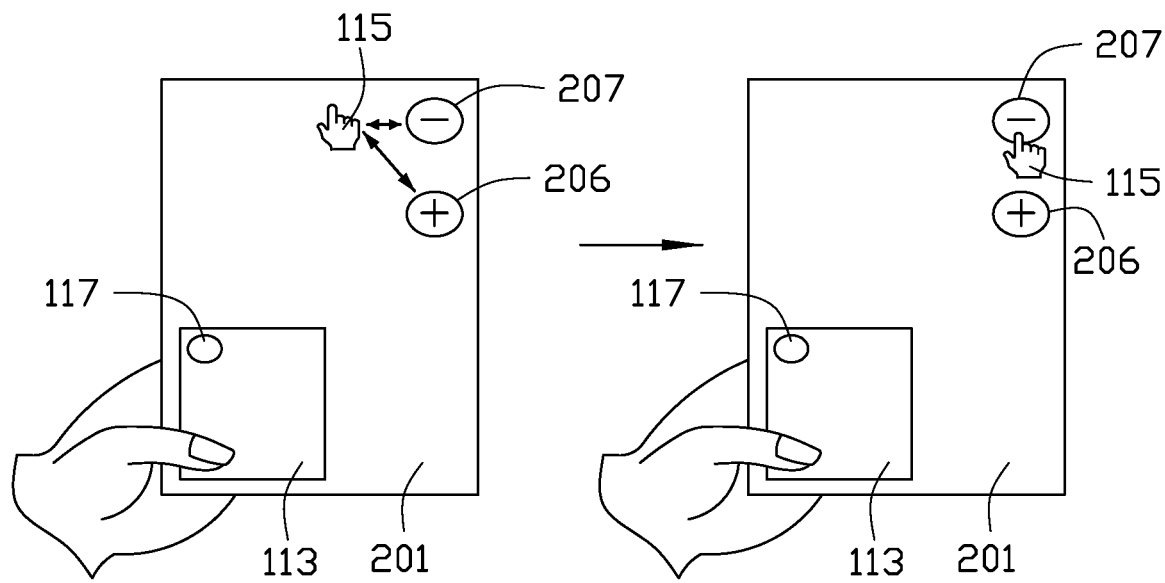
FIG. 6 is another schematic view showing the touch icon of the touch extension unit of FIG. 3 is controlled to be paired with a closest function control key.

As illustrated in FIG. 6, the second distance is less than the first distance, the touch icon control unit 151 controls the touch icon 115 to be paired with the second control element 207 (e.g., a reducing key), that is, the second control element 207 is selected by default and the touch icon 115 is automatically moved. The movement continues until the indication position of touch icon 115 is moved to the closest second control element 207 and the second control element 207 (e.g., a reducing key) is lit to remind the user.

In this exemplary embodiment, when a function corresponding to a highlighted control element needs to be performed, the second touch operation can be performed directly on the touch area 113 without having to move the touch icon 115 again. Obviously, the above-described automatic matching method can effectively save a user operation time, and it is more practical to save the movement time of the touch icon 115 or to facilitate the user to quickly align a smaller control element.

In this exemplary embodiment, a generation, starting, and closing of the touch extension unit 111 may be achieved by, but not limited to, following methods:

Method 1: a sliding operation from an edge of the display screen 201, for example, one edge of the upper, lower, left, and right sides of the display screen 201, towards inside the display screen 201 is defined to generate and activate the touch extension unit 111. A reverse operation of sliding out from inside of the display screen 201 towards the edge of the display screen 201 is defined to close the touch extension unit 111.

Mode 2: when the display screen 201 detects a click operation or a long pressing operation, the touch extension unit 111 is generated and activated at the click position or the long pressing position. In other exemplary embodiments, the operation is not limited to be a click or a long pressing, and can be a force-touch method or other methods capable of triggering the display screen 201. When the display screen 201 detects a click operation, a long pressing operation, a force-touch operation, or other operations capable of triggering the display screen 201 again, the touch extension unit 111 is turned off and disappears.

Figure 7:
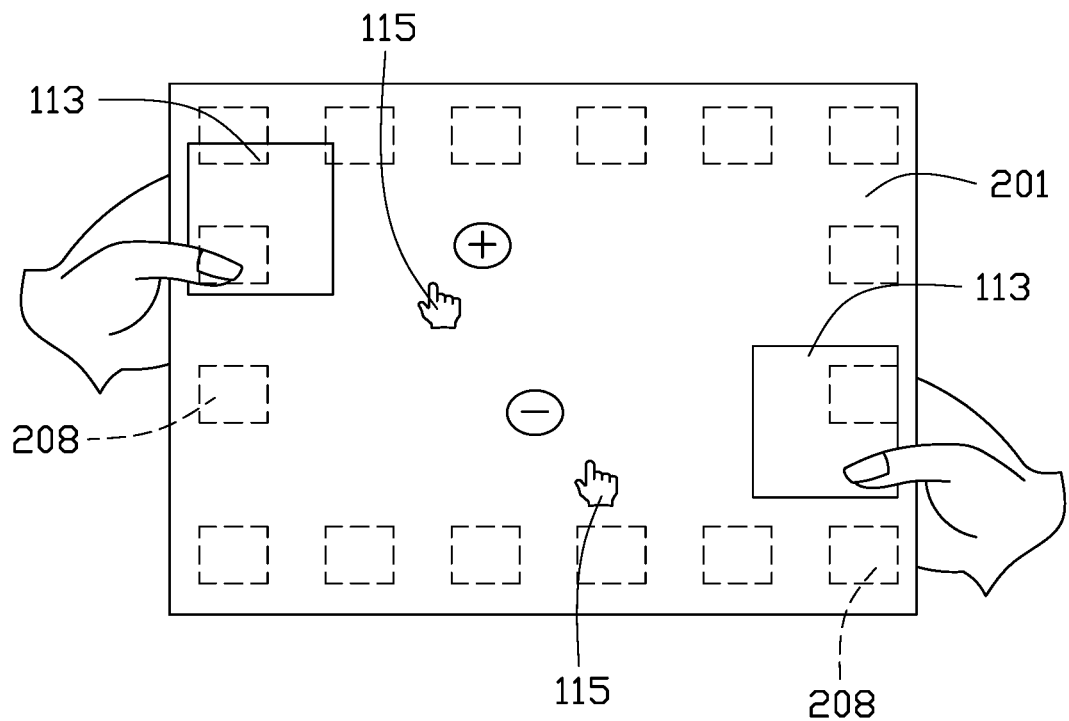
FIG. 7 is a schematic diagram showing generating and starting the touch extension unit of FIG. 3 through sensing a grip position of the user.

Mode 3: as illustrated in FIG. 7, the electronic device 200 further includes a plurality of sensing units 208. The sensing units 208 may be arranged at the edge of a front surface of the electronic device 200 (i.e., the surface on which the display panel 201 is located), the edge of a back surface of the electronic device 200 (i.e., the surface opposite to the display screen 201 of the electronic device 200), or side surfaces of the electronic device 200 (i.e., the surfaces positioned between the front surface and the back surface of the electronic device 200). The sensing units 208 sense grip positions of the user on the electronic device 200. The sensing units 208 further generate and activate a touch extension unit 111 at a corresponding position corresponding to each of the sensed grip positions of the user. In this exemplary embodiment, the corresponding position is a location closest to the grip position on the display screen 201.

For example, when the sensing units 208 sense that the electronic device 200 is hold by a left hand of the user, a right hand of the user, or two hands of the user, the sensing units 208 detect at least one grip position to generate and activate a touch extension unit 111 at each corresponding position corresponding to each of the sensed grip positions. For example, as illustrated in FIG. 7, there are two touch extension units 111 respectively correspond to a grip position of the left hand of the user and a grip position of the right hand of the user. In this exemplary embodiment, when a hand of the user is removed, the sensing units 208 do not sense a grip, then the touch extension unit 111 corresponding to the removed hand is turned off and disappears.

In other exemplary embodiments, in method 1 and method 2, the two touch extension units 111 are also allowed to be operated simultaneously by the two hands of the user.

Figure 8:
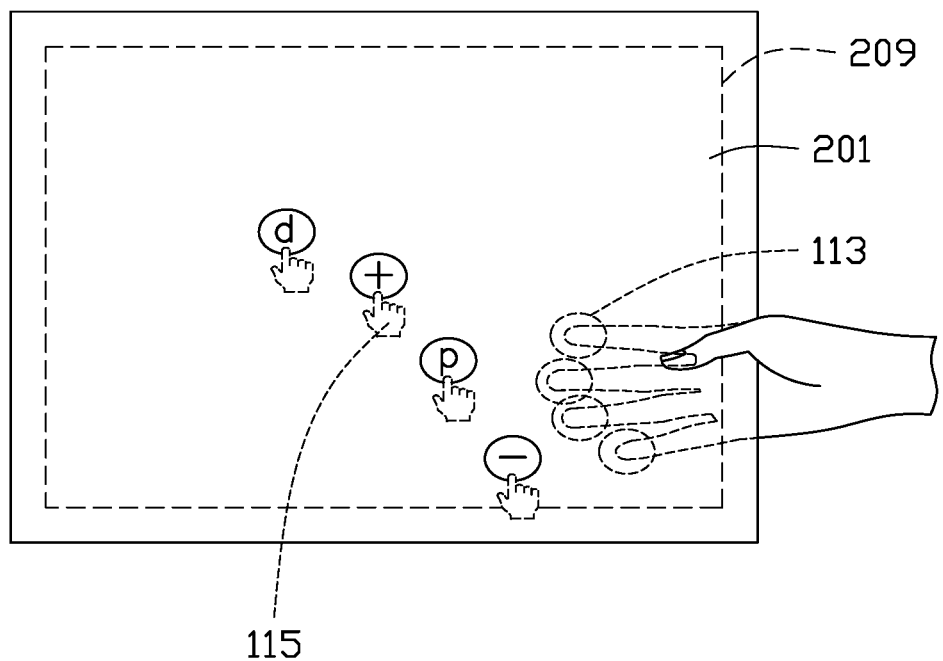
FIG. 8 is another schematic diagram showing generating and starting the touch extension unit of FIG. 3 through sensing touch positions of multiple fingers of the user.

Mode 4: as illustrated in FIG. 8, the electronic device 200 further include a touch panel 209. The touch panel 209 is positioned at the back surface of the electronic device 200. In this exemplary embodiment, the touch panel 209 is only used to sense a touch operation without a display capability. The touch panel 209 senses touch positions of fingers of a user on the back surface of the electronic device 200. The touch panel 209 further generates a touch icon 115 at a position corresponding to the touch position for each finger located on the back surface of the electronic device 200. That is, each finger located on the back surface of the electronic device 200 has one touch icon 115 respectively. Each touch icon 115 may be displayed with different colors and/or different shapes to distinguish operations of multiple fingers. In this exemplary embodiment, the touch area 113 is the entire touch panel 209 or a part of the touch panel 209. In this way, the touch icon 115 can be touched by each finger located on the back surface of the electronic device 200 to move and perform various operations respectively, thereby realizing a multi-finger operation.

Figure 9:
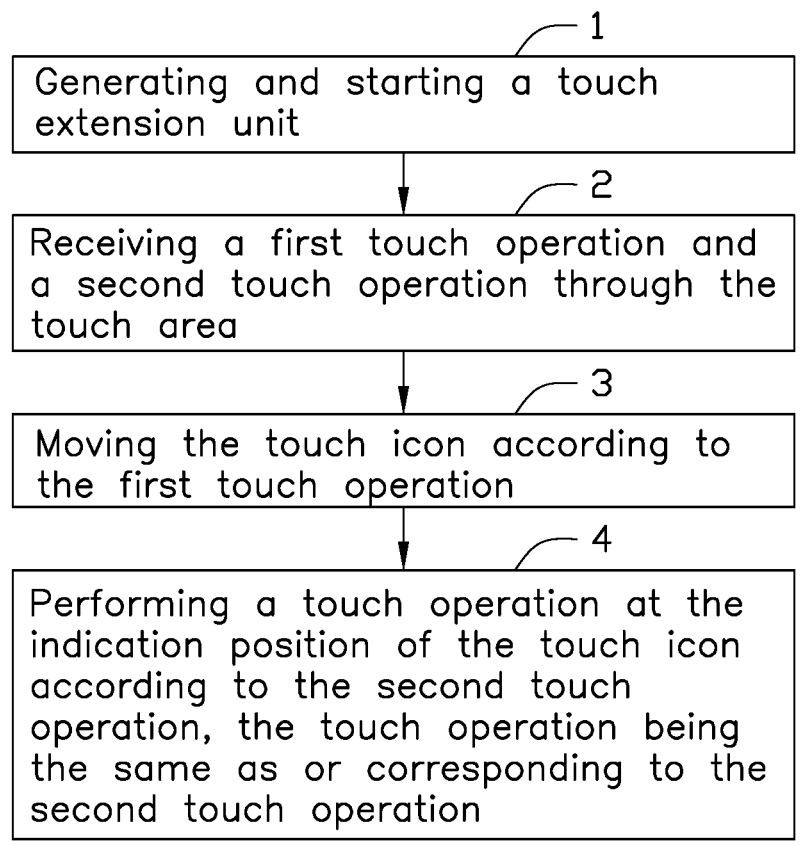
FIG. 9 is a flowchart of a display screen control method.

FIG. 9 illustrates a flowchart of a method for controlling a display screen. The method is provided by way of example, as there are a variety of ways to carry out the method. Each block shown in FIG. 9 represents one or more processes, methods, or subroutines which are carried out in the example method. Furthermore, the order of blocks is illustrative only and additional blocks can be added or fewer blocks may be utilized without departing from the scope of this disclosure.

At block 1, a touch extension unit 111 is generated and started.

In block 1, the touch extension unit 111 is displayed on the display screen 201 of the electronic device 200. The touch extension unit 111 includes a touch area 113 and a touch icon 115.

In this exemplary embodiment, a step of generating and starting the touch extension unit 111 can be realized by the above-described method 1, method 2, method 3, or method 4.

At block 2, receiving a first touch operation and a second touch operation through the touch area 113.

At block 3, moving the touch icon 115 according to the first touch operation and an indication position of the touch icon 115 is moved to a touched position.

In block 3, the touched position is usually one of the control elements displayed on the display screen 201.

In block 3, the touch area 113 is separated with the touch icon 115. That is, the touch icon 115 is an icon independently positioned outside the touch area 113 and an indication position of the touch icon 115 is also located outside the touch area 113. In this exemplary embodiment, the touch icon 115 can be moved through performing a first touch operation on the touch area 113. The detection module 13 detects the first touch operation. Specifically, the touch icon control unit 151 controls the touch icon 115 to perform a corresponding action based on the first touch operation of the object (for example, the user's finger) on the touch area 113. For example, when the detection module 13 detects that the user's finger is moving, rotating, or the like on the touch area 113, the touch icon control unit 151 controls the touch icon 115 to perform a corresponding movement, rotation, or the like.

In this exemplary embodiment, the first touch operation may include a movement direction, a displacement size, and/or a movement speed of an object, such as a user's finger on the touch area 113.

In block 3, the touch icon control unit 151 further controls the touch icon 115 to move along the movement direction of the object (such as the user's finger) on the touch area 113 detected by the detection module 13. When the touch icon control unit 151 controls the touch icon 115 to move, the touch icon control unit 151 also determines a displacement size and a speed of the touch icon 115 according to the displacement size and the speed of the object on the touch area 113 detected by the detection module 13. The touch icon control unit 151 further controls a movement of the touch icon 115 according to the determined displacement size and the speed. That is, the movement of the object (such as the user's finger) on the touch area 113 is in a mapping relationship with the movement of the touch icon 115. For example, the displacement size and the movement speed of the first touch operation on the touch area 113 can multiply a preset value by the touch icon control unit 151 to serve as a displacement size and a movement speed of the touch icon 115.

In block 3, the touch icon control unit 151 further controls the touch icon 115 to move accordingly with a position generating the touch icon 115 as a starting position.

In block 3, when the touch icon 115 moves on the display screen 201, the touch icon control unit 151 further dynamically calculates a distance between the indication position of the touch icon 115 and a control element in a vicinity of the touch icon 115. When the distance is less than a predetermined distance, the touch icon control unit 151 automatically moves the touch icon 115. Then the indication position of the touch icon 115 is moved to the control element and the control element is lit to remind the user.

In other exemplary embodiments, when there is a plurality of control elements in a vicinity of the touch icon 115 and the distances between the plurality of control elements and the indication position of the touch icon 115 are all less than the predetermined distance, the touch icon control unit 151 searches a control element which is closest to the indication position of the touch icon 115. That is, the touch icon 115 is controlled to be paired with the closest control element and the touch icon 115 is automatically moved, so that the indication position of the touch icon 115 is moved to the closest control element and the closest control element is lit to remind the user. Obviously, the above-described automatic matching method can effectively save a user operation time, and it is more practical to save the movement time of the touch icon 115 or to facilitate the user to quickly align a smaller control element.

At block 4, performing a touch operation according to an indication position of the second touch operation on the touch icon 115. The touch operation is the same as or corresponding to the second touch operation.

In block 4, when the first touch operation is performed on the touch area 113, then an indication position of the touch icon 115 is moved to any one of the control elements on the display screen 201, for example, a zooming key. Then through clicking the execution icon 117, the function execution unit 153 performs an operation which is the same as or corresponding to the clicking. That is, through clicking the zooming key to perform an enlarging function, for example, enlarging texts and/or images.

In this exemplary embodiment, the control elements may be a control key of a user interface displayed on the display screen 201, icons for initiating various application programs (Apps), and/or other icons or areas that may accept various touch operations.

In this exemplary embodiment, in block 4, the second touch operation is not limited to click the execution icon 117 and may also be other touch methods. For example, the execution icon 117 may be omitted and the second touch operation may be performed by clicking, long pressing, sliding, double-clicking, or force-touching the touch area 113, or simply leaving the touch area 113. Then, at the indication position of the touch icon 115, the function execution unit 153 is triggered to perform an operation which is the same as or corresponding to the second touch operation. For example, in other exemplary embodiments, when the App on the display screen 201 needs to be activated, only the touch area 113 is operated by the finger of the user, then the indication position of the touch icon 115 is controlled to move to an activated App icon position, and releases the finger (that is, the finger leaves the touch area 113). The detection module 13 detects a departure of the user's finger, then causes the function execution unit 153 to perform a corresponding operation, that is, starting the App. The above-described operation method is as follow: to perform a first touch operation on the touch area 113→to control the indication position of the touch icon 115 to move to the activated App icon position→to perform a second touch operation (release finger)→the function execution unit 153 activates the App, which needs not to operate the execution icon 117, that is, the execution icon 117 may be omitted.

Figure 10:
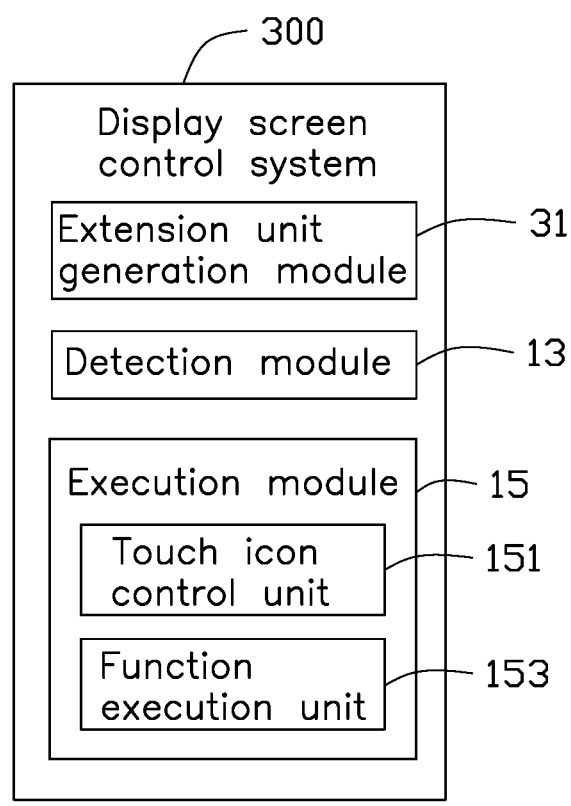
FIG. 10 is a block diagram of a display screen control system according to a second exemplary embodiment of the present disclosure.
Figure 11:
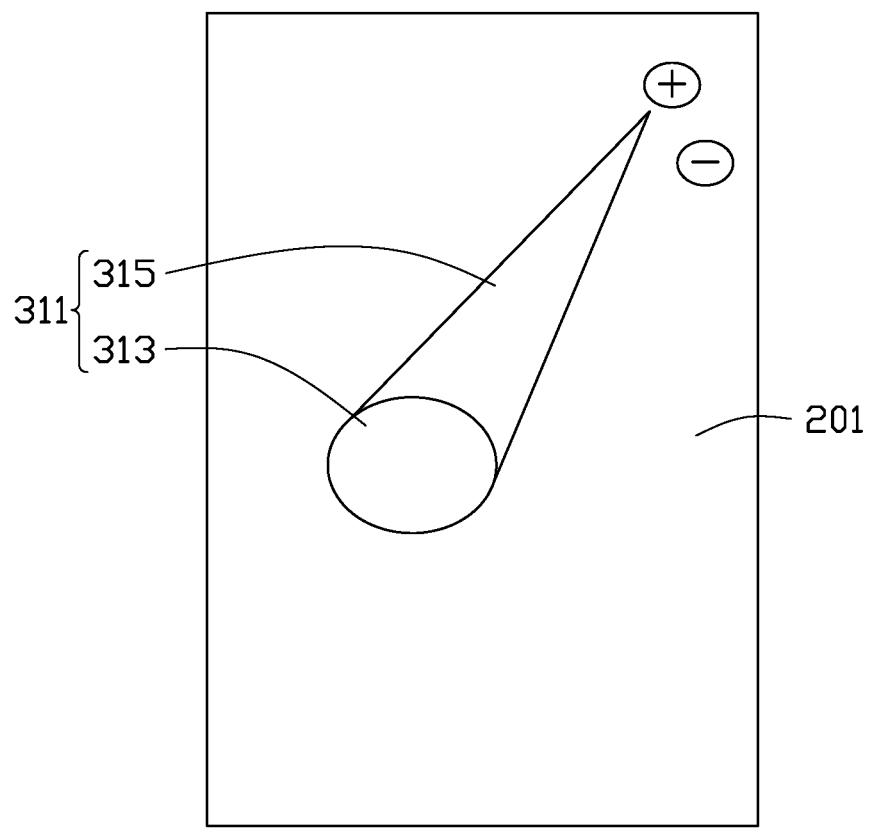
FIG. 11 is a schematic view of a touch extension unit of the display screen control system of FIG. 10.

FIG. 10 and FIG. 11 illustrate a second exemplary display screen control system 300. The display screen control system 300 differs from the display screen control system 100 in that the extension unit generation module 31 generates a touch extension unit 311. The touch extension unit 311 includes a touch area 313 and a touch icon 315. The touch icon 315 is connected to the touch area 313. In this way, the touch area 313 and the touch icon 315 can move synchronously according to the first touch operation.

In this exemplary embodiment, the touch area 313 is substantially circular. The touch icon 315 is substantially tapered. In other exemplary embodiments, the shapes of the touch area 313 and the touch icon 315 can be adjusted according to the user's needs.

The indication position of the touch icon 315 can be synchronously moved to a touched position through performing the first touch operation on the touch area 313. Then performs the second touch operation on the touch area 313, which causes the function execution unit 153 to perform a touch operation at an indication position of the touch icon 315 according to the second touch operation. The touch operation is the same as or corresponding to the second touch operation. In this exemplary embodiment, the indication position of the touch icon 315 is at a tapered tip of the touch icon 315.

In this exemplary embodiment, it is similar to the first exemplary embodiment that the second touch operation can be performed through clicking, long pressing, sliding, force-touch the touch area 313, or the like to trigger the function execution unit 153 to perform a same or corresponding operation as the second touch operation at the indication position of the touch icon 315.

In this exemplary embodiment, when the touch area 313 moves on the display screen 201 together with the touch icon 315, the touch icon control unit 151 further dynamically calculates a distance between the indication position of the touch icon 315 and a control element in a vicinity of the touch icon 315. When the distance is less than a predetermined distance, the touch icon control unit 151 automatically moves the touch icon 315. Then the indication position of the touch icon 315 is moved to the control element and the control element is lit to remind the user.

In other exemplary embodiments, when there is a plurality of control elements in a vicinity of the touch icon 315 and the distances between the plurality of control elements and the indication position of the touch icon 315 are all less than the predetermined distance, the touch icon control unit 151 searches a control element which is closest to the indication position of the touch icon 315. That is, the touch icon 315 is controlled to be paired with the closest control element and the touch icon 315 is automatically moved, so that the indication position of the touch icon 315 is moved to the closest control element and the closest control element is lit to remind the user.

Figure 12:
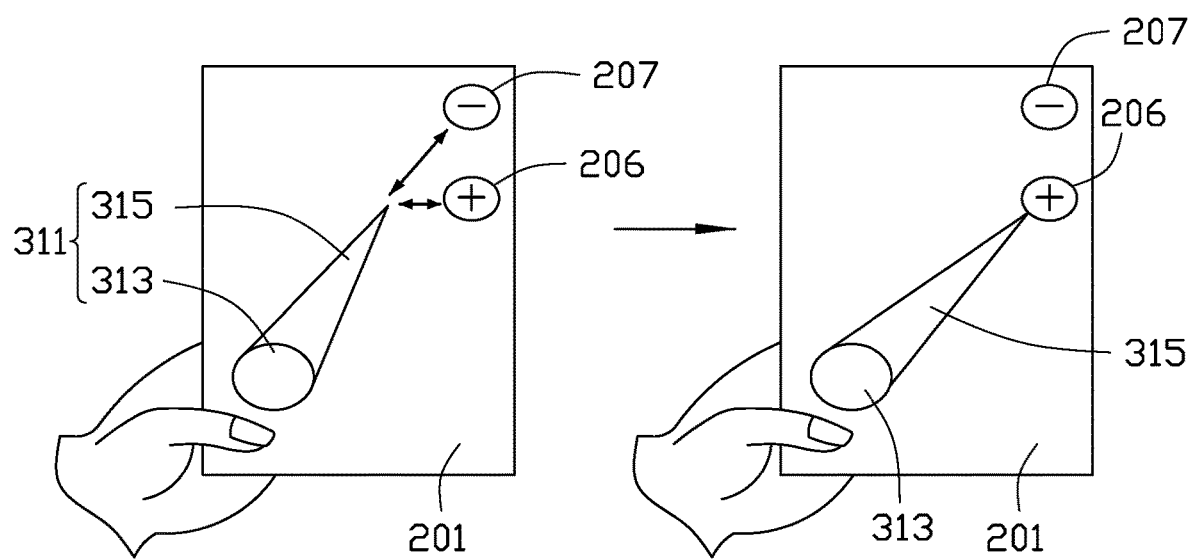
FIG. 12 is a schematic view showing the touch icon of the touch extension unit of FIG. 11 is controlled to be paired with a closest function control key.

For example, as illustrated in FIG. 12, when the touch icon 315 moves on the display screen 201 together with the touch area 313, the touch icon control unit 151 dynamically calculates a first distance between the indication position of the touch icon 315 and the first control element 206 (e.g., a zoom key) in the vicinity of the touch icon 315 and a second distance between the indication position of the touch icon 315 and the second control element 207 (e.g., a reducing key) in the vicinity of the touch icon 315. When the first distance is less than the second distance, the touch icon control unit 151 controls the touch icon 315 to be paired with the first control element 206 (e.g., a zoom key), that is, the first control element 206 is selected by default and the touch icon 315 is automatically moved. The movement continues until the indication position of touch icon 315 is moved to the closest first control element 206 and the first control element 206 (e.g., a zoom key) is lit to remind the user.

Figure 13:
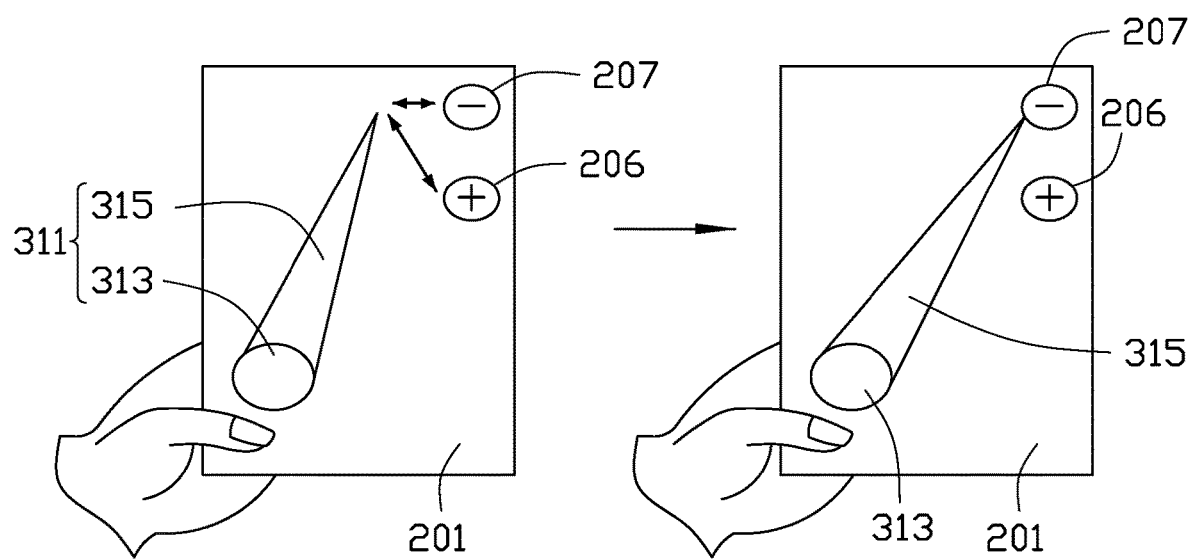
FIG. 13 is another schematic view showing the touch icon of the touch extension unit of FIG. 11 is controlled to be paired with a closest function control key.

As illustrated in FIG. 13, the second distance is less than the first distance, the touch icon control unit 151 controls the touch icon 315 to be paired with the second control element 207 (e.g., a reducing key), that is, the second control element 207 is selected by default and the touch icon 315 is automatically moved. The movement continues until the indication position of touch icon 315 is moved to the closest second control element 207 and the second control element 207 (e.g., a reducing key) is lit to remind the user. Obviously, the above-described automatic matching method can effectively save a user operation time, and it is more practical to save the movement time of the touch icon 315 or to facilitate the user to quickly align a smaller control element.

In this exemplary embodiment, a generation, starting, and closing of the touch extension unit 311 may be achieved by, but not limited to, following methods:

Method 1: a sliding operation from an edge of the display screen 201, for example, one edge of the upper, lower, left, and right sides of the display screen 201, towards inside the display screen 201 is defined to generate and activate the touch extension unit 311. A reverse operation of sliding out from inside the display screen 201 towards the edge of the display screen 201 is defined to close the touch extension unit 311.

In this exemplary embodiment, a sliding direction of the sliding operation is the direction of the indication position of the touch icon 315 relative to the touch area 313. For example, when a sliding operation from a left side of the display screen 201 towards inside the display screen 201 is performed, the touch icon 315 points towards the right side of the display screen 201.

Mode 2: when the display screen 201 detects a click operation or a long pressing operation, the touch extension unit 311 is generated and activated at the click position or the long pressing position. In other exemplary embodiments, the operation is not limited to be a click or a long pressing, and can be a force-touch method or other method capable of triggering the display screen 201. When the display screen 201 detects a click operation, a long pressing operation, a force-touch operation, or other operations capable of triggering the display screen 201 again, the touch extension unit 111 is turned off and disappears.

Figure 14:
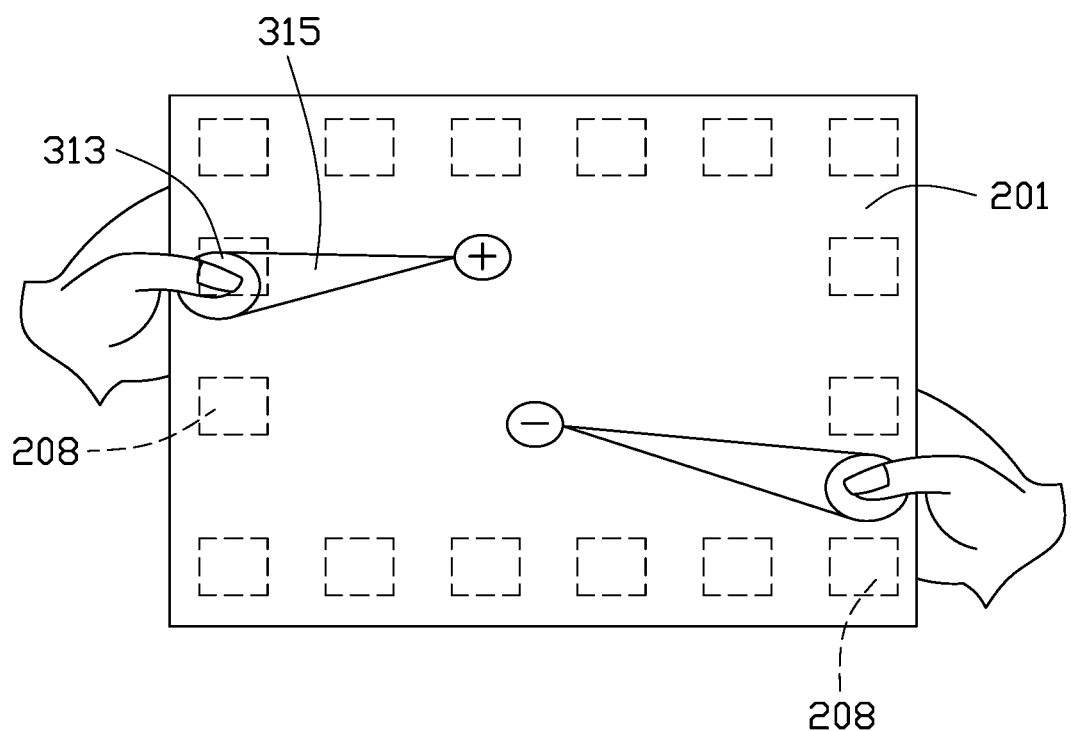
FIG. 14 is a schematic diagram showing generating and starting the touch extension unit of FIG. 11 through sensing a grip position of the user.

Mode 3: as illustrated in FIG. 14, it is similar to first exemplary embodiment that the electronic device 200 further includes a plurality of sensing units 208. The sensing units 208 may be arranged at the edge of a front surface of the electronic device 200 (i.e., the surface on which the display panel 201 is located), the edge of a back surface of the electronic device 200 (i.e., the surface opposite to the display screen 201 of the electronic device 200), or side surfaces of the electronic device 200 (i.e., the surfaces positioned between the front surface and the back surface of the electronic device 200). The sensing units 208 sense grip positions of the user on the electronic device 200. The sensing units 208 further generate and activate a touch extension unit 311 at a corresponding position corresponding to each of the sensed grip positions of the user. In this exemplary embodiment, the corresponding position is a location closest to the grip position on the display screen 201.

For example, when the sensing units 208 sense that the electronic device 200 is hold by a left hand of the user, a right hand of the user, or two hands of the user, the sensing units 208 detect at least one grip position to generate and activate a touch extension unit 311 at each corresponding position corresponding to each of the sensed grip positions. For example, as illustrated in FIG. 14, there are two touch extension units 111 respectively correspond to a grip position of the left hand of the user and a grip position of the right hand of the user. In this exemplary embodiment, when a hand of the user is removed, the sensing units 208 do not sense a grip, then the touch extension unit 111 corresponding to the removed hand is turned off and disappears.

In other exemplary embodiments, in method 1 and method 2, the two touch extension units 311 are also allowed to be operated simultaneously by the two hands of the user.

Figure 15:
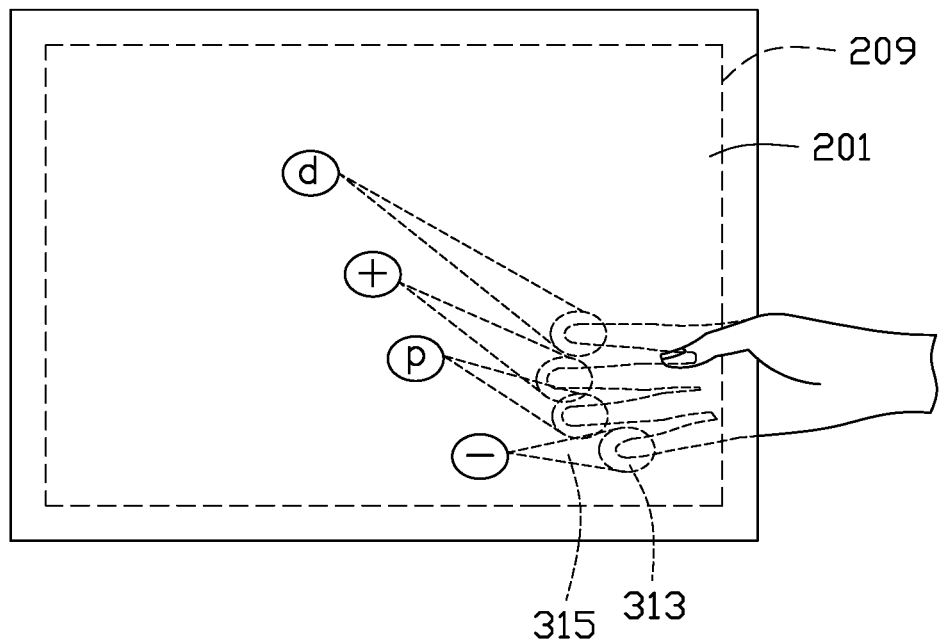
FIG. 15 is another schematic diagram showing generating and starting the touch extension unit of FIG. 11 through sensing touch positions of multiple fingers of the user.

Mode 4: as illustrated in FIG. 15, the electronic device 200 further include a touch panel 209. The touch panel 209 is positioned at the back surface of the electronic device 200. In this exemplary embodiment, the touch panel 209 is only used to sense a touch operation without a display capability. The touch panel 209 senses a touch position of a finger of a user on the back surface of the electronic device 200. The touch panel 209 further generates a touch icon 115 at a position corresponding to the touch position for each finger located on the back surface of the electronic device 200. That is, each finger located on the back surface of the electronic device 200 has one touch area 313 and touch icon 315 respectively. In this way, the touch area 313 and the touch icon 315 can be touched by each finger located on the back surface of the electronic device 200 to move and perform various operations respectively, thereby realizing a multi-finger operation.

In this exemplary embodiment, a third touch operation on the touch icon 315 can be performed, for example, the touch icon 315 can be rotated about the touch area 313 through dragging the touch icon 315, thereby to adjust an indication position of the touch icon 315 relative to the touch area 313. For example, the touch icon 315 is originally directed to an upper right corner of the display screen 201. Through performing the third touch operation on the touch icon 315, such as dragging the touch icon 315 and rotating the touch icon 315 halfway around the touch area 313, the touch icon 315 is directed to a lower left corner of the display screen 201.

In this exemplary embodiment, a fourth touch operation on the touch icon 315 can be performed, for example, the touch icon 315 can be dragged to adjust a relative distance between an indication position of the touch icon 315 and the touch area 313. For example, the touch icon 315 is dragged in a direction close to the touch area 313, thereby shortening the touch icon 315 (i.e., shortening a relative distance between the indication position of the touch icon 315 and the touch area 313). For example, the touch icon 315 is dragged in a direction away from the touch area 313, thereby extending the touch icon 315 (i.e., extending a relative distance between the indication position of the touch icon 315 and the touch area 313). As such, when the electronic device 200 is a large screen device, the extension of the touch icon 315 facilitates the user to operate the farther control element, which is more practical.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. An electronic device, comprising:
   a processor; and
   a touch display screen, the touch display screen displaying a touch icon;
   wherein the processor receives a first touch operation and a second touch operation through a touch area of the electronic device;
   wherein the processor moves the touch icon according to the first touch operation;
   wherein the processor performs a touch operation at an indication position of the touch icon according to the second touch operation, and the touch operation is the same as or corresponding to the second touch operation;
   wherein the indication position of the touch icon is located outside the touch area; and
   wherein the processor receives a third touch operation through the touch icon and adjusts a direction of the indication position relative to the touch area according to the third touch operation.

2. The electronic device of claim 1, wherein the touch area comprises an execution icon, the processor receives the second touch operation through the execution icon and receives the first touch operation through other part of the touch area.

3. The electronic device of claim 1, wherein the touch icon is connected to the touch area; wherein the touch area and the touch icon move synchronously according to the first touch operation.

4. The electronic device of claim 3, wherein the touch display screen displays the touch area and the touch icon according to a sliding operation from an edge of the touch display screen towards inside the touch display screen, and a sliding direction of the sliding operation is a direction of the indication position of the touch icon relative to the touch area.

5. The electronic device of claim 3, wherein the processor receives a fourth touch operation through the touch icon and adjusts a relative distance between the indication position and the touch area according to the fourth touch operation.

6. The electronic device of claim 1, wherein the touch display screen is at a front surface of the electronic device, the touch area is a touch panel at a back surface of the electronic device.

7. The electronic device of claim 1, further comprising a plurality of sensing units, wherein the sensing units sense a grip position of the user, and the touch display screen displays the touch area and/or the touch icon at a corresponding position corresponding to the grip position.

8. The electronic device of claim 1, wherein the processor calculates a distance between the indication position and a control element displayed on the touch display screen, and when the distance is less than a predetermined distance, the processor moves the touch icon so that the indication position of the touch icon is moved to the control element.

9. The electronic device of claim 1, wherein the processor calculates a distance between the indication position and each of a plurality of control elements displayed on the touch display screen, and when a plurality of the distances between the control elements and the indication position of the touch icon are all less than a predetermined distance, the processor moves the touch icon so that the indication position of the touch icon is moved to the one of the control elements which is closest to the indication position.

10. A display screen control system applied in an electronic device, the electronic device comprising a touch display screen, a storage unit, and a processor; the system comprising:
   a plurality of modules which are a collection of computerized instructions stored in the storage unit, executed by the processor, and cause the processor to:
      generate a touch extension unit, the touch extension unit comprising a touch area and a touch icon, the touch display screen displaying the touch icon, and an indication position of the touch icon located outside the touch area;
      detect a first touch operation and a second touch operation on the touch area;
      move the touch icon according to the first touch operation and perform a touch operation at the indication position of the touch icon according to the second touch operation; and receiving a third touch operation through the touch icon and adjusting a direction of the indication position relative to the touch area according to the third touch operation;

wherein the touch operation is the same as or corresponding to the second touch operation.

11. A display screen control method applied to an electronic device, the electronic device comprising a touch display screen; the method comprising:
   (a) generating a touch extension unit, the touch extension unit comprising a touch area and a touch icon, the touch display screen displaying the touch icon, and an indication position of the touch icon located outside the touch area;
   (b) receiving a first touch operation and a second touch operation through the touch area;
   (c) moving the touch icon according to the first touch operation; and
   (d) performing a touch operation at the indication position of the touch icon according to the second touch operation, the touch operation being the same as or corresponding to the second touch operation.

12. The method of claim 11, wherein step (a) further comprising:
   sensing a touch position of a finger of a user on a back surface of the electronic device, generating and activating the touch extension unit at a position corresponding to the touch position.

13. The method of claim 11, wherein the touch icon is an icon independently positioned outside the touch area and step (c) further comprises:
   detecting the first touch operation on the touch area;
   controlling the touch icon to move along a movement direction of the first touch operation on the touch area; and/or
   determining a displacement size and a movement speed of the touch icon according to a displacement size and a movement speed of the first touch operation on the touch area, and controlling a movement of the touch icon according to the determined displacement size and the determined movement speed.

14. The method of claim 13, wherein the determined displacement size and the determined movement speed of the touch icon are respectively the displacement size and the movement speed of the first touch operation on the touch area multiplied by a preset value.

15. The method of claim 11, wherein the touch icon is connected to the touch area, and in step (c), the touch area and the touch icon move synchronously according to the first touch operation.

16. The method of claim 11, wherein step (c) further comprising:
   calculating a distance between the indication position of the touch icon and a control element displayed on the touch display screen when the touch icon moves, and when the distance is less than a predetermined distance, moving the touch icon so that the indication position of the touch icon is moved to the control element; and/or
   calculating a distance between the indication position and each of a plurality of control elements displayed on the touch display screen, and when a plurality of the distances between the control elements and the indication position of the touch icon are all less than the predetermined distance, moving the touch icon so that the indication position of the touch icon is moved to the one of the control elements which is closest to the indication position.

17. The method of claim 11, further comprising:
   receiving a fourth touch operation through the touch icon and adjusting a relative distance between the indication position and the touch area according to the fourth touch operation.

18. The method of claim 11, wherein the first touch operation is rotating or moving; wherein the second touch operation is clicking, long pressing, sliding, double-clicking, force-touching, or leaving the touch area.

* * * * *